United States Patent [19]
Walker

[11] 3,927,138
[45] Dec. 16, 1975

[54] PROCESSES FOR DEHYDROGENATION OF HYDROCARBONS

[75] Inventor: Darrell W. Walker, Bartlesville, Okla.

[73] Assignee: Phillips Petroleum Company, Bartlesville, Okla.

[22] Filed: Aug. 14, 1974

[21] Appl. No.: 497,290

Related U.S. Application Data

[60] Continuation-in-part of Ser. No. 374,649, June 28, 1973, abandoned, which is a division of Ser. No. 140,967, May 6, 1971, Pat. No. 3,790,501.

[52] U.S. Cl. .......................... 260/680 E; 260/683.3
[51] Int. Cl.² .......................................... C07C 5/48
[58] Field of Search ..................... 260/680 E, 683.3

[56] References Cited
UNITED STATES PATENTS

| | | | |
|---|---|---|---|
| 3,555,105 | 1/1971 | Nolan et al...................... | 260/680 E |
| 3,790,501 | 2/1974 | Walker............................ | 260/680 E |

*Primary Examiner*—Paul M. Coughlan, Jr.

[57] ABSTRACT

Organic compounds are dehydrogenated to compounds having a higher degree of unsaturation by contacting the feedstock in the vapor phase in the presence of an oxygen-containing gas with a catalyst formed by combining at least one of nickel, cobalt or iron in association with tin, phosphorus and an alkali metal. Representative of such conversions is the oxidative dehydrogenation of, e.g., butane to butenes and butadiene. The conversion products are valuable compounds particularly useful as intermediates for the preparation of polymeric materials such as synthetic rubbers and the like.

7 Claims, No Drawings

PROCESSES FOR DEHYDROGENATION OF HYDROCARBONS

This is a continuation-in-part of application Ser. No. 374,649, filed June 28, 1973, now abandoned, which is a division of application Ser. No. 140,967, filed May 6, 1971, now U.S. Pat. No. 3,790,501.

The present invention relates to chemical compositions and chemical processes. More particularly, the invention relates to catalyst compositions, their preparation and the catalytic processes employing such compositions, e.g., processes for effecting the dehydrogenation of hydrocarbons.

Thermal noncatalytic and catalytic processes for converting organic compounds to compounds having a higher degree of unsaturation are known. The former are characterized by undesirable side reactions, low order of conversion and yields and poor selectivity to desired product. The catalytic processes are characterized by the particular catalytic material employed and the conditions under which the processes are operated, e.g., in the absence or presence of oxygen. While a number of such catalytic processes have attained some measure of commercial success, there is a continuing search for better catalytic materials which exhibit the high activity, high yield to desired product, high selectivity to desired product, extended longevity, which can be readily regenerated to an activity approaching that of fresh catalyst, and which keep undesirable side reactions to a minimum; all characteristics of good dehydrogenation catalysts. The vexations problem constantly faced by those skilled in the art is the identification and characterization of the compositions which are highly efficient dehydrogenation catalysts.

Among the more recently disclosed dehydrogenation catalysts are those which include halogens or halogen-releasing materials. Such catalysts have exhibited so many disadvantages in regard to equipment corrosion and the additional expense of continuously feeding, recovering and recycling the relatively expensive halogen materials that economically practical, large scale use of such catalytic materials has been precluded. Halogen-free catalytic materials continue to be the most desirable for use in oxidative dehydrogenation processes.

The present invention provides a novel catalyst and a novel process for the conversion of hydrocarbon feedstocks to hydrocarbons having a greater degree of unsaturation and which have the same or lower number of carbon atoms as the hydrocarbon feed. According to this invention, hydrocarbon feedstocks can be converted directly to hydrocarbons having a greater degree of unsaturation by contacting said feedstocks under dehydrogenation conditions in the vapor phase in the presence of molecular oxygen with a catalytic material formed of at least one metal selected from the group consisting of nickel, iron or cobalt in association with tin, phosphorus and at least one alkali metal wherein at least one of said nickel, iron, or cobalt metal, tin, phosphorus or alkali metal is combined with oxygen. Thus, paraffinic hydrocarbons can be converted in good yields to diolefins and/or monoolefins and monoolefins can be converted to diolefins. The invention is particularly applicable for the production of diolefins from paraffins and particularly useful results are obtained by the dehydrogenation of butane to butenes and butadiene, of isopentane to isoamylenes and isoprene, and butenes to butadiene.

The hydrocarbon feedstocks which are applicable for the oxidative dehydrogenation processes of the present invention comprise dehydrogentable aliphatic hydrocarbons having from about two to about 12 carbon atoms per molecule and at least one

grouping. These can be branched or unbranched and include paraffins as well as monoolefins, but the application of the process for paraffins is presently considered most advantageous. The conversions of butane to butenes and butadiene, of isopentane to isoamylenes and isoprene, and butenes to butadiene has been found particularly effective. Some specific examples of other feeds include isobutane, pentane, hexane, 2-methylhexane, octane, 2,4-dimethyloctane, 2-methylbutene-1, hexene-2, octene-1, 3-methylnonene-4, dodecene-1, and the like, including mixtures thereof.

The catalysts of the present invention comprise at least one metal selected from the group consisting of nickel, cobalt or iron in association with tin and phosphorus, and also associated with a minor proportion of an alkali metal. For simplicity, the nickel, cobalt and iron group is referred to as the ferrous metals of Group VIII or merely as the ferrous metals. The elements contained in the catalyst are not necessarily in the elemental state but can be combined with sufficient oxygen to form one or more neutral compounds such as nickel stannate, cobalt phosphate, iron stannate, nickel oxide, iron oxide, potassium phosphate, sodium stannate, etc., depending upon the proportions of the elements present. The alkali metal is present in the catalyst in a dehydrogenation promoting amount. It is preferred that the catalyst of the present invention can contain each of the above-mentioned elements in amounts shown in the following table.

| Element | Weight Percent Broad | Preferred |
|---|---|---|
| Ferrous Metal | 20–75 | 22–45 |
| Tin | 1–50 | 14–48 |
| Phosphorus | 0.5–12 | 2–6 |
| Alkali Metal | variable* | |

*When the alkali metal is potassium, the weight percent is in the range of 0.5 to 6, preferably from 2 to 4; when the alkali metal is other than potassium (lithium, sodium, rubidium or cesium) then such alkali metal is included in an amount which is the equivalent, on an atomic basis, of from 0.5 to 6 weight percent potassium.

The percentages shown above are based upon a total weight of the finished catalyst, and the difference between the total of the weights of the above-named elements and 100 percent is made up by its oxygen content in amounts sufficient to satisfy the valences of each of the elements in the catalyst. Sufficient oxygen is present to satisfy the valence requirements of the elements contained in the composition.

These catalysts can also be supported on or diluted with conventional catalytic materials such as silica, alumina, boria, magnesia, titania, zirconia, and combinations thereof as well as with other similar conventional materials known in the art.

The catalysts of the present invention can be prepared by any suitable method. In a preferred embodiment, a mixture of a suitable tin compound and a suitable ferrous metal compound is coprecipitated while in the presence of a suitable alkali metal compound. Alternatively, a suitable mixture of a tin compound and a ferrous metal compound can be coprecipitated, and the resulting wet gel can be impregnated with a suitable alkali metal compound.

The phosphorus component of the catalyst composition can be introduced at any time. Thus, the phosphorus component can be introduced to the mixture containing the tin component and the ferrous metal component before, during or after the point at which the alkali metal component is introduced. The phosphorus component need not be introduced in the wet gel stage, but the dried, and even calcined, gel can be impregnated with a suitable phosphorus-containing compound. Within these limits, any suitable sequence of steps can be employed such that the resulting catalytic composition will have a catalytic surface area of at least one square meter per gram.

A particularly convenient procedure is to introduce the alkali metal component to the coprecipitation zone by employing an alkali metal stannate compound, such as potassium stannate, sodium stannate, and the like, as a source of the tin component. After the stannate compound has been coprecipitated with a suitable ferrous metal compound, the alkali metal content of the resulting wet gel can be adjusted to the desired level either by water washing, if the alkali metal content is too high, or by impregnation with an alkali metal compound, if the alkali metal content is too low.

Depending upon the proportions of tin, ferrous metal and phosphorus compounds in the coprecipitation stage, the addition of an inorganic base may be required during coprecipitation to maintain a suitable pH of about 7 or higher. An alkali metal hydroxide can be convenient for this purpose, and the alkali metal from this source, depending upon the degree of washing which may follow, can be utilized to provide a portion of the desired alkali metal content of the finished catalyst.

Substantially any ferrous metal, tin, phosphorus and alkali metal compound can be employed in the preparation of the catalyst so long as none of the compounds are detrimental to the final oxidative dehydrogenation catalyst and so long as other elements, other than oxygen, in the compounds used are substantially removed from the final catalyst composition by prior washing or by volatilization. In some instances, however, small amounts of some other elements, which are involved in the preparation of the catalyst, can be tolerated in the final catalytic composition. For example, if a sulfate such as nickel sulfate or tin sulfate is employed in the preparation, small residual amounts of sulfur can be tolerated. Halogen residues, on the other hand, are less desirable in the catalyst. Generally, the preferred ferrous metal, tin, phosphorus and alkali metal compounds are either the oxides of these elements or compounds convertible to the oxide on calcination. Some examples of these are nickel nitrate, cobalt acetate, phosphoric acid, ferric nitrate, nickel stannate, potassium stannate, stannic chloride, stannous oxalate, potassium hydroxide, rubibium nitrate, sodium carbonate, lithium phosphate, cesium tartrate, and the like, and mixtures thereof.

Regardless of the specific sequence of steps utilized in the catalyst preparation method, the last stage of the preparation is activation by calcination in an oxygen-containing gas such as air at a temperature of 900° to 1,800°F for 1 to 24 hours, or until the catalyst is active for oxidative dehydrogenation. The solid catalyst composition can be conventionally formed and utilized in any conventional shape or form such as tablets, extrudates, granules, powder, agglomerates, and the like.

The dehydrogenatable feedstocks are converted according to the processes and the catalysts of the present invention at temperatures in the range of from about 800° to about 1,300°F, preferably from about 950° to about 1,200°F, at any convenient pressure such as from about 7 to 250 psia, and at a volumetric hydrocarbon:oxygen ratio of about 1:1 to about 1:4. The presence of steam is frequently beneficial and volumetric steam:hydrocarbon ratios up to 50:1 can be used. The hydrocarbon feed rate will generally be in the range of from about 50 to about 5,000 GHSV. The fixed catalyst bed is the preferred mode of contact but other modes such as a fluidized bed can also be used.

The hydrogenation process is ordinarily carried out by forming a mixture, preferably a preheated mixture, of the dehydrogenatable feed, the oxygen-containing gas, and the steam (if used) and passing this mixture over the catalyst at the desired temperature. The effluent from the reaction zone is subjected to any suitable separation method to isolate and recover the desired products. Unconverted feeds or partially converted materials can be recycled.

The catalysts of the present invention can be utilized for long periods of time without regeneration. However, when regeneration does become necessary, this can be simply accomplished by merely cutting off the flow of dehydrogenatable feedstock and allowing the catalyst to be contacted with the oxygen and steam for a sufficient period of time to restore substantial activity to the catalyst.

Generally, at least trace amounts of oxygenated products are also formed in these reactions. For example, compounds such as furan, acetaldehyde, furfural, and acetic acid, and the like, can be obtained. Some carbon oxides will be formed as well as some cracking products. In some cases, butadiene can be formed as a by-product of the oxidative dehydrogenation of isopentane to isoprene.

The invention can be illustrated by the following examples.

EXAMPLE I

A series of five catalysts was prepared in which the catalyst composition was essentially identical except for the level of potassium. Solutions of equimolar amounts of $K_2SnO_3 \cdot 3H_2O$ and $Ni(NO_3)_2 \cdot 6H_2O$ were mixed simultaneously and dropwise with stirring at a pH of 7–9. The resulting precipitate was filtered and divided into five portions. The washing procedure for each of these portions was varied ranging from no washing at all to four water washes, thereby influencing the residual potassium level in each portion. Following the washing, each portion was imprgenated which the same amount of phosphoric acid such that the finished catalyst (after drying, calcining at 1,100°F for 3 hours, grinding and screening to 20–40 mesh) contained about 5 weight percent P, about 23 weight percent Ni, and about 44 weight percent Sn, by weight. Each of these catalysts was used to promote the oxidative dehydrogenation of butane in runs in which the butane, suitably diluted with air and steam, was passed over the catalyst at essentially similar temperatures. The space rates for the butane, air, and steam were 300, 1,500, and 3,000 GHSV, respectively. After about 60 minutes on-stream, the gaseous effluent from the reaction zone was sampled and analyzed by gas-liquid chromatography. The conversion and the selectivity to desired products was then calculated. The results of these runs are chosen in Table I.

Table I

| Oxidative Dehydrogenation of Butane | | | | | |
|---|---|---|---|---|---|
| Run | 1 | 2 | 3 | 4 | 5 |
| Catalyst | A | B | C | D | E |
| No. of Washings of Wet Gel | 0 | 1 | 2 | 3 | 4 |
| Residual Potassium, wt.% | 7.8 | 2.1 | 0.47 | 0.16 | 0.02 |
| Surface Area, m²/g | 45 | 69 | — | — | 154 |
| Reaction Temp., °F. | 1125 | 1125 | 1150 | 1150 | 1170 |
| Conversion, % | 23.4 | 30.7 | 28.2 | 27.3 | 29.1 |
| Yield, %, to: | | | | | |
| Butadiene | 0.0 | 12.4 | 11.7 | 10.9 | 10.0 |
| Butenes | 2.5 | 5.7 | 0.7 | 0.2 | 0.7 |
| Cracked Products | 12.4 | 4.9 | 3.9 | 2.8 | 4.0 |
| Carbon Oxides | 7.3 | 7.5 | 11.4 | 12.8 | 13.8 |
| Modivity[1], %, to: | | | | | |
| Butadiene | 0 | 40 | 41 | 40 | 34 |
| Butadiene & Butenes | 11 | 59 | 44 | 41 | 37 |
| All Olefins | 65 | 75 | 57 | 51 | 52 |

[1]Simplified selectivity based on analysis of gas phase products for converted hydrocarbons, oxides of carbon and unconverted feed. As used herein, and in the subsequent examples, conversions/yields are reported on same basis as modivity.

The results of these series of runs show that the presence of certain levels of potassium in the Ni/Sn/P/O oxidative dehydrogenation catalyst is beneficial. In Run 2, for example, it is seen that the presence of about 2 weight percent potassium in the catalyst results in low combustion to carbon oxides and a much higher yield of dehydrogenated product, especially to butenes. Additionally, the data show that excessive amounts of potassium are detrimental in that there is a drastic decrease in the modivity to butadiene.

EXAMPLE II

Preparation of Catalyst F

In a manner essentially similar to that of Example I, a catalyst was prepared using the same ingredients except that a 2:1 molar ratio of Ni:Sn was used in the coprecipitation, and the washing of the wet gel was limited to allow a substantial residual potassium content. Thus, the catalyst contained about 4 percent P, 2–3 percent K, 36 percent Ni, and 36 percent Sn.

EXAMPLE III

Preparation of Catalyst G

In this example, a catalyst having a 3:1 molar ratio of Ni:Sn was prepared. An 80 g quantity of $K_2SnO_3 \cdot 3H_2O$ was dissolved in sufficient distilled water to make a 320 cc solution. Similarly, 210 g of $NiSO_4 \cdot 6H_2O$ was dissolved to make a 600 cc solution, and 52.8 g of KOH (85%) was dissolved to make a 200 cc solution. The above tin and nickel solutions were added simultaneously and dropwise, to 600 cc of distilled water while maintaining a pH of 7.8–9.0 with the KOH solution. The resulting precipitate was filtered, washed once with 900 cc distilled water and again with 300 cc distilled water. A 142 g portion of the wet gel was mixed with 4.0 g of $H_3PO_4$ (85%) then dried at 105°C and calcined in flowing air at 1,100°F for 3 hours. The resulting solid was ground and screened to a 20–20 mesh size. The finished catalyst had a surface area of 65 m²/g and contained 35 percent Ni, 23 percent Sn, 3.4 percent P, 4.5 percent S, and 3.3 percent K, by weight.

EXAMPLE IV

Preparation of Catalyst H

In this example, a catalyst having a Ni:Sn molar ratio of 6:1 was prepared. A 40 g quantity of $K_2SnO_3 \cdot 3H_2O$ was diluted with sufficient water to make a 300 cc solution. Similarly, 210 g of $NiSO_4 \cdot 6H_2O$ was diluted to 600 cc, and 52.8 g of KOH (85%) was diluted to 200 cc. The nickel and the tin solutions were mixed, simultaneously and dropwise, in 400 cc distilled water with sufficient KOH solutions to maintain a pH of 7.0–8.5. The resulting precipitate was washed once with 1,000 cc $H_2O$ then again with 1,200 cc $H_2O$. A 128 g portion of the wet gel was mixed with 3.07 g of $H_3PO_4$ (85%) followed by drying at 105°C, calcining 3 hours at 1,100°F in flowing air, and grinding and screening to 20–40 mesh particles. The finished catalyst had a surface area of 65 m²/g, and contained 46 percent Ni, 15 percent Sn, 3.4 percent P, 5.0 percent S, and 1.4 percent K, by weight.

EXAMPLE V

Preparation of Catalyst I

In this example, a related iron-containing catalyst was prepared. A 60 g quantity of $K_2SnO_3 \cdot 3H_2O$ and 81 g of $Fe(NO_3)_3 \cdot 9H_2O$ were each dissolved in sufficient distilled water to make 200 cc solutions of each. Each of these solutions was added, simultaneously and dropwise, to 200 cc distilled water. A 2 M solution of KOH was added during the precipitation to maintain a pH of about 8. The resulting precipitate was filtered, and washed once with 750 cc distilled water. A 100 gram portion of the wet gel was mixed with 3.6 g of $H_3PO_4$ (85%) dried at 105°C, calcined at 1,100°F for 3 hours in flowing air, and ground and screened to 20–40 mesh particle size. The finished catalyst had a surface area of 81 m²/g, and contained 22 percent Fe, 45 percent Sn, about 2 percent K, and 3.9 percent P, by weight.

EXAMPLE VI

Preparation of Catalyst J

In this example, a cobalt-containing catalyst was prepared. A 60.0 g quantity of $K_2SnO_3 \cdot 3H_2O$ and 50.0 g quantity of $Co(NO_3)_2 \cdot 6H_2O$ were each dissolved in sufficient water to make a 200 ml solution of each.

These two solutions were added, simultaneously and dropwise, to 200 cc distilled water such that the final pH was 7.5. The precipitate was filtered and washed once with 750 cc distilled water, yielding 116 g of wet gel. A 5.6 gram portion of the wet gel was treated with 3.6 g $H_3PO_4$ (85%) which was diluted to 20 cc with water. The mixture was then dried at 105°C, calcined in flowing air at 1,100°F for 3 hours, ground and screened to 20–40 mesh particle size. The finished catalyst contained 22 percent Co, 48 percent Sn, about 2 percent K, and 4.2 percent P, by weight.

EXAMPLE VII

Preparation of Catalyst K

In this example, a sodium-containing catalyst was prepared. A 53.6 g quantity of $Na_2SnO_3.3H_2O$ and 58.0 g $Ni(NO_3)_2.6H_2O$ were each dissolved in sufficient distilled water to give 225 cc solutions of each. These solutions were then added dropwise and silumtaneously, to 200 cc distilled water such that the final pH was 8.7. The resulting precipitate was filtered, washed once with 750 cc distilled water and mixed with 7.5 g of $H_3Po_4$ (85%), diluted to 40 cc with water. The mixture was dried at 105°C, calcined at 1,100°F for 3 hours in air, and ground and screened to 20–40 mesh particle size. The finished catalyst had a surface area of 94.4 m²/g, and contained 22 percent Ni, 42 percent Sn, about 1 percent Na, and 4.1 percent P, by weight.

EXAMPLE VIII

Each of the catalysts F–K, whose preparation was described in precious examples, was then used to promote the oxidative dehydrogenation of several feedstocks. In each run, the feed was passed over the catalyst at designated conditions and the effluent was sampled after a designated time on-stream. The results of these conversions are shown in the following table.

The data in the above table illustrate the operability of the catalyst of the present invention when applied to two different paraffinic feeds. Additionally, it is shown that the nickel component can be replaced by iron or cobalt and that the potassium component can be replaced by sodium.

EXAMPLE IX

Four catalysts were prepared by coprecipitation and impregnated with varying amounts of phosphorus according to the general procedure given above. These catalysts, containing about 53 weight percent Ni, 11.5 weight percent Sn, 0.7 weight percent K and phosphorus in amounts as shown in Table III below, were used to promote the oxidative dehydrogenation of butane in runs in which the butane, suitably diluted with air and steam, was passed over the catalyst at essentially similar temperatures. The space rates for the butane, air and steam were 1,000, 1,000 and 10,000 GHSV, respectively. After 62 hours on stream, the gaseous effluent from the reaction zone was sampled and analyzed by gasliquid chromatography. The results of these runs are shown in Table III.

Table III

| | Oxidative Dehydrogenation of Butane | | | |
|---|---|---|---|---|
| Run | 12 | 13 | 14 | 15 |
| Phosphorus, wt.% | 5.3 | 7.9 | 9.8 | 11.7 |
| Surface Area, m²/g | 126 | — | — | 43 |
| Reaction Temp., °F | 1050 | 1050 | 1050 | 1050 |
| Conversion, % | 29 | 18 | 12 | 7 |
| Yield, %, to butenes and butadiene | 24.5 | 17.0 | 11.7 | 7.0 |

The above data illustrate the operability of catalysts of the present invention containing a low weight percent potassium with varying amounts of phosphorus.

While certain embodiments of the invention have been described for illustrative purposes, the invention is not limited thereto. Various other modifications or embodiments of the invention will be apparent to those skilled in the art in view of this disclosure. Such modifications or embodiments are within the spirt and scope of the disclosure.

What is claimed is:

1. A process for the dehydrogenation of a hydrocarbon feedstock having 2 to 12 carbon atoms and at least one Table II

| | Oxidative Dehydrogenation | | | | | |
|---|---|---|---|---|---|---|
| Run | 6 | 7 | 8 | 9 | 10 | 11 |
| Catalyst | F | G | H | I | J | K |
| Feed | Butane | Isopentane | Isopentane | Butane | Butane | Butane |
| GHSV | | | | | | |
| Feed | 500 | 1000 | 1000 | 300 | 300 | 300 |
| Air | 3000 | 5500 | 5000 | 1500 | 1500 | 1500 |
| Steam | 6000 | 19600 | 10000 | 3200 | 3700 | 3000 |
| On-Stream, hr. | 12 | 12 | 12 | 1 | 1 | 12 |
| Temp., °F | 1100 | 1050 | 1100 | 1100 | 1100 | 1100 |
| Conversion, % | 47 | 21.3 | 25 | 28.2 | 36.1 | 35.6 |
| Yields, %, to: | | | | | | |
| Diolefins | 22.3 | 7.5 | 6.6 | 3.6 | 8.2 | 16.5 |
| Monoolefin | 5.3 | 4.9 | 2.0 | 8.2 | 5.0 | 3.5 |
| Cracked | | 2.2 | | 3.1 | 10.2 | 3.9 |
| Carbon Oxides | | 6.7 | | 13.0 | 12.7 | 11.5 |
| Modivity[1], to: | | | | | | |
| Mono- + Dienes | 58 | 58.2 | 35 | 41.8 | 36.5 | 56.9 |

[1] Modivity is a modified selectivity based on analysis of gas phase products for converted hydrocarbons, oxides of carbon and unconverted feed.

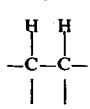

grouping which comprises contacting said feedstock in the vapor phase under dehydrogenation conditions in the presence of molecular oxygen with a catalyst comprising from 20 to 75 weight percent of at least one ferrous metal selected from the group consisting of nickel, cobalt and iron;
from about 1 to about 50 weight percent of tin;
from about 0.5 to about 12 weight percent of phosphorus; and
at least one alkali metal in an amount equivalent, on an atomic basis, to about 0.5 to about 6 weight percent of potassium;
wherein at least one of said ferrous metal, said tin, said phosphorus and said alkali metal is associated with oxygen.

2. A process according to claim 1 wherein the amount of said ferrous metal is in the range of about 22 to 45 weight percent, the amount of said tin is in the range of about 14 to about 48 weight percent, the amount of said phosphorus is in the range of about 2 to about 6 weight percent and the amount of said alkali metal is in the range of about 2 to about 4 weight percent.

3. A process according to claim 2 wherein said hydrocarbon feedstock contains from four to 12 carbon atoms.

4. A process according to claim 1 wherein said hydrocarbon feedstock comprises at least one butene.

5. A process according to claim 1 wherein said hydrocarbon feedstock comprises at least one paraffinic hydrocarbon.

6. A process according to claim 5 wherein said hydrocarbon feedstock comprises butane.

7. A process according to claim 5 wherein said hydrocarbon feedstock comprises isopentane.

* * * * *